M. TIBBETTS.
GEAR CUTTING MACHINE.
APPLICATION FILED FEB. 21, 1918.

1,398,477.

Patented Nov. 29, 1921.
4 SHEETS—SHEET 1.

INVENTORS
Milton Tibbetts,
BY
Foster Freeman Watson & Coit
ATTORNEYS

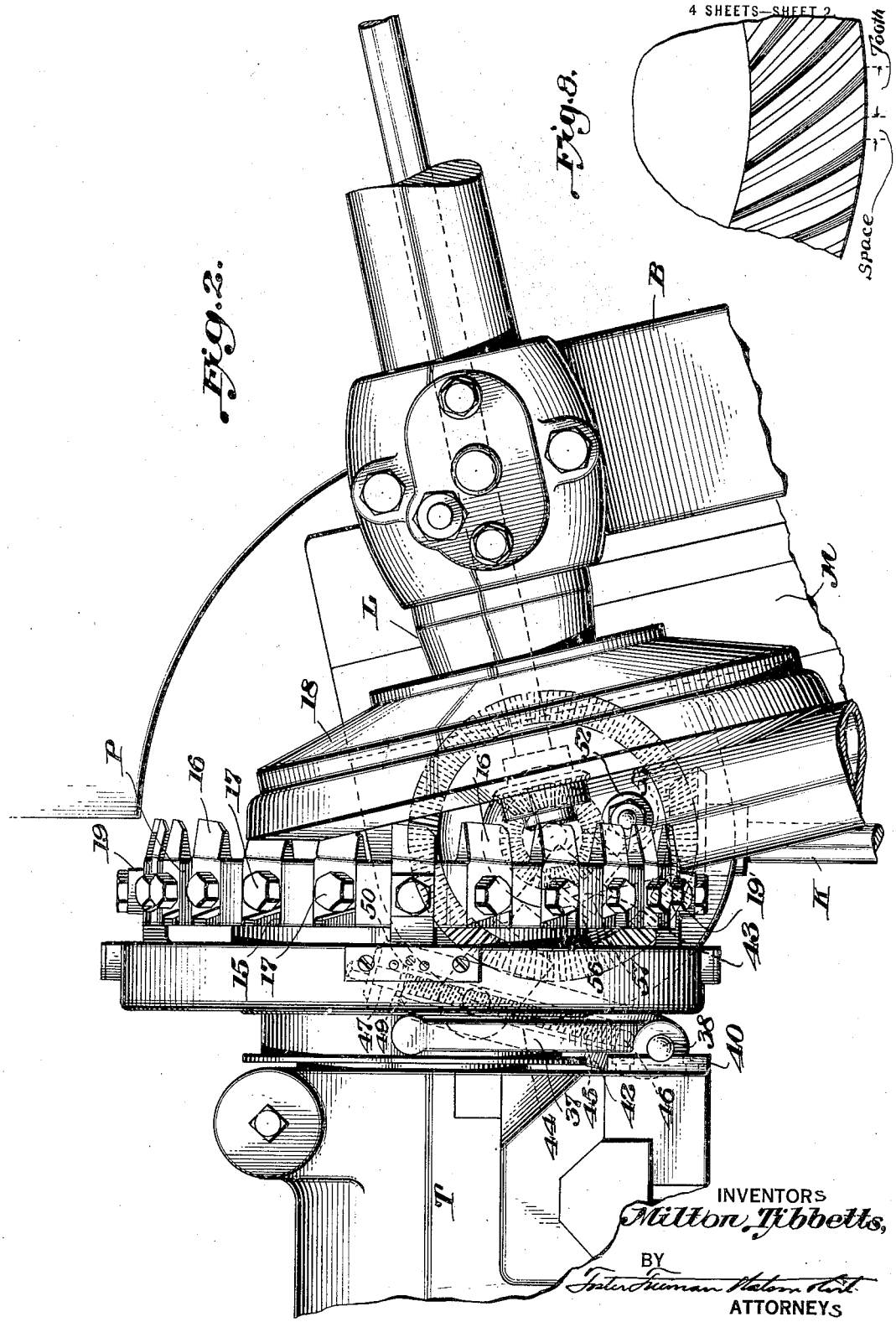

M. TIBBETTS.
GEAR CUTTING MACHINE.
APPLICATION FILED FEB. 21, 1918.
1,398,477.
Patented Nov. 29, 1921.
4 SHEETS—SHEET 3.
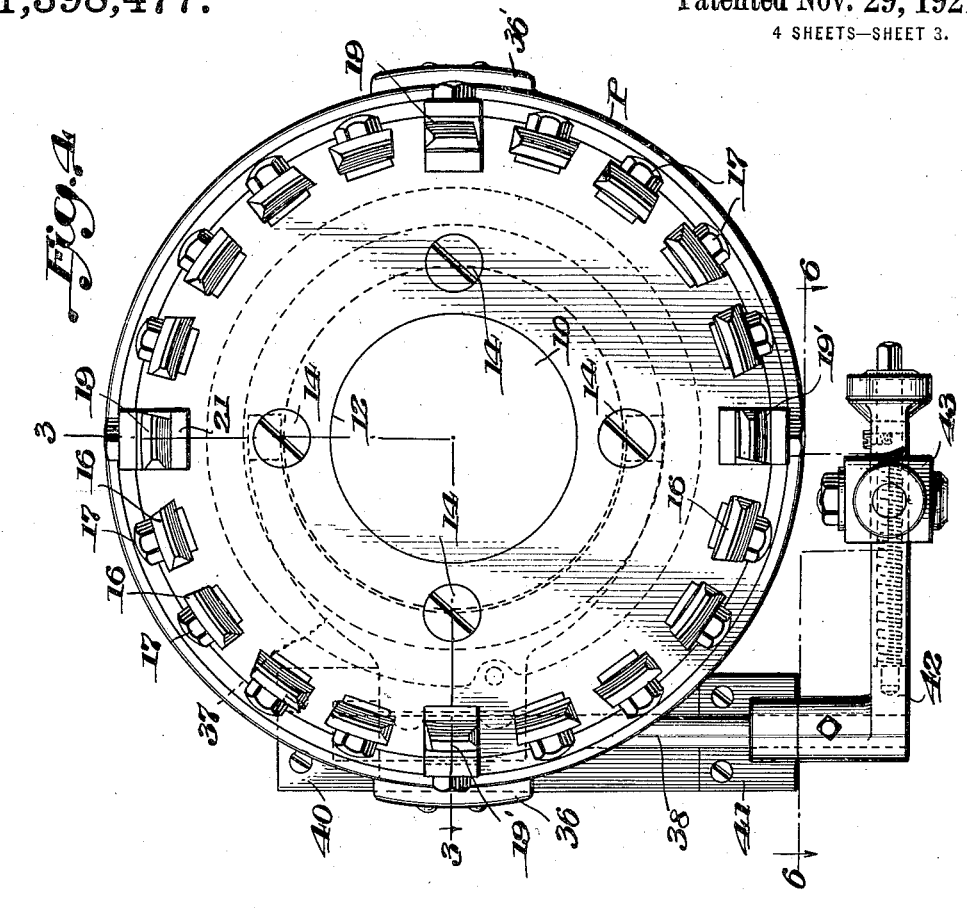
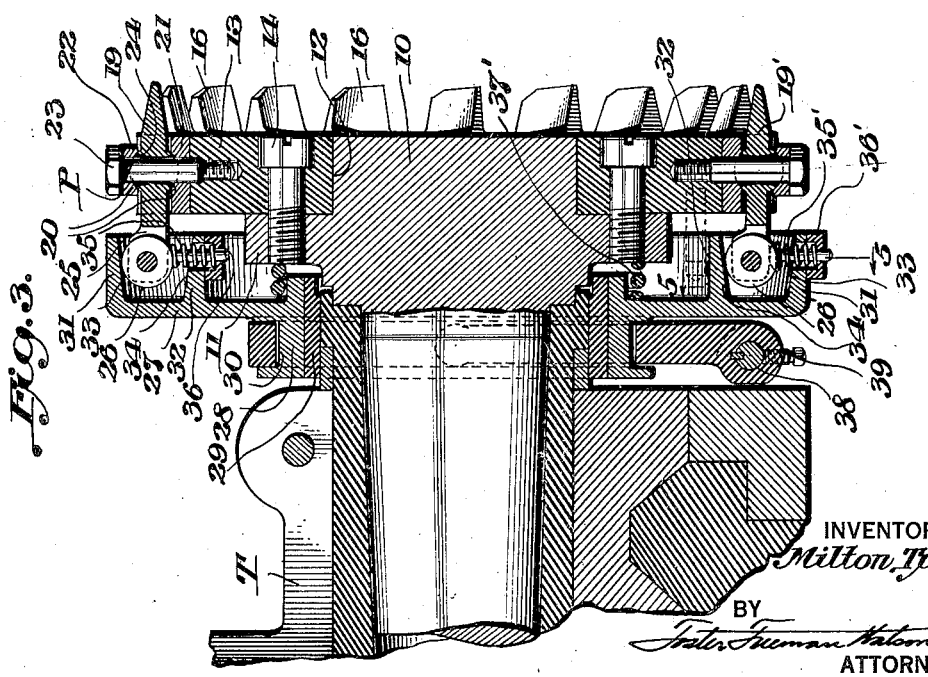
INVENTORS
Milton Tibbetts,
BY
ATTORNEYS M. TIBBETTS.
GEAR CUTTING MACHINE.
APPLICATION FILED FEB. 21, 1918.
1,398,477.
Patented Nov. 29, 1921.
4 SHEETS—SHEET 4.
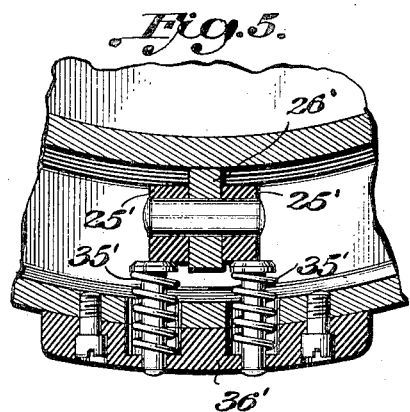
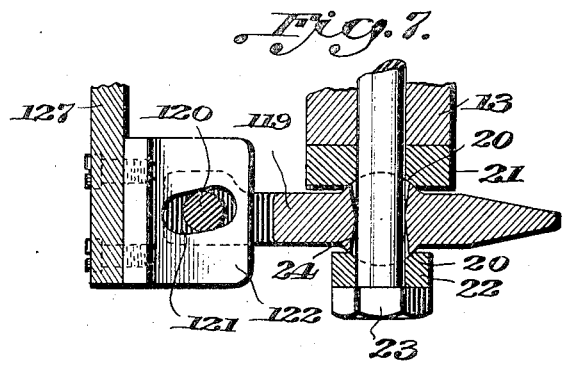
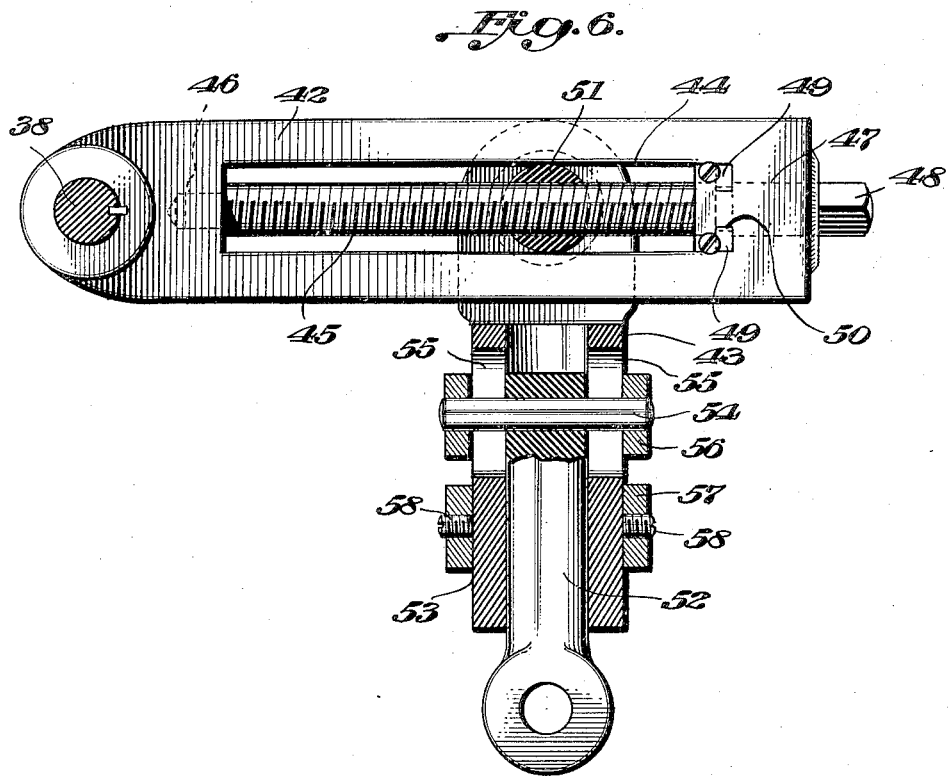
INVENTORS.
Milton Tibbetts,
BY
Foster Freeman Watson Coit
ATTORNEYS.

UNITED STATES PATENT OFFICE.

MILTON TIBBETTS, OF DETROIT, MICHIGAN, ASSIGNOR, BY MESNE ASSIGNMENTS, TO JAMES E. GLEASON, TRUSTEE, OF ROCHESTER, NEW YORK.

GEAR-CUTTING MACHINE.

1,398,477.      Specification of Letters Patent.      Patented Nov. 29, 1921.

Application filed February 21, 1918. Serial No. 218,557.

*To all whom it may concern:*

Be it known that I, MILTON TIBBETTS, a citizen of the United States, and residing at Detroit, Wayne county, State of Michigan, have invented certain new and useful Improvements in Gear-Cutting Machines, of which the following is a specification.

This invention relates to a machine for cutting materials and more particularly to a metal cutting machine.

The principal features of the invention consist in the provision of a cutter having a cutting edge which is adjustable into and out of cutting position; in the provision of such a cutter or tool in combination with a machine having a work support and a tool support, one of which is mounted for swinging movements; in the provision of a cutter having a plurality of cutting edges, one of which is movable into and out of cutting position; in the provision of a tool having an adjustable cutting edge, and means for automatically adjusting the same; and in the provision of a cutter for gear cutting machines, said cutter having a roughing cutting edge and a finishing cutting edge, the latter being adjustable into and out of cutting position.

Other features consist in the details of construction and still others will be apparent from the description taken in connection with the drawings, in which:

Fig. 2 is a top plan view to a larger scale showing the cutter and the parts immediately adjacent thereto;

Fig. 3 is a longitudinal sectional view through the cutter taken substantially on the line 3—3 of Fig. 4 and showing its supporting means and certain of the parts for actuating the movable cutting edges of the same;

Fig. 4 is a front elevation of the cutter and part of the connections for actuating the adjustable cutting edges;

Fig. 5 is a sectional view of a detail taken substantially on the line 5—5 of Fig. 3;

Fig. 6 is a view partially in section taken substantially on the line 6—6 of Fig. 4 of the linkage for actuating the cam controlling the movable cutting edges;

Fig. 7 is a sectional view of a detail illustrating a modified means for actuating the movable cutting edges.

Fig. 8 is a view of part of a gear blank showing a few teeth as formed on the machine of the present invention when it is built to cut the type of gears described in Patent #1,112,509.

Figure 1:
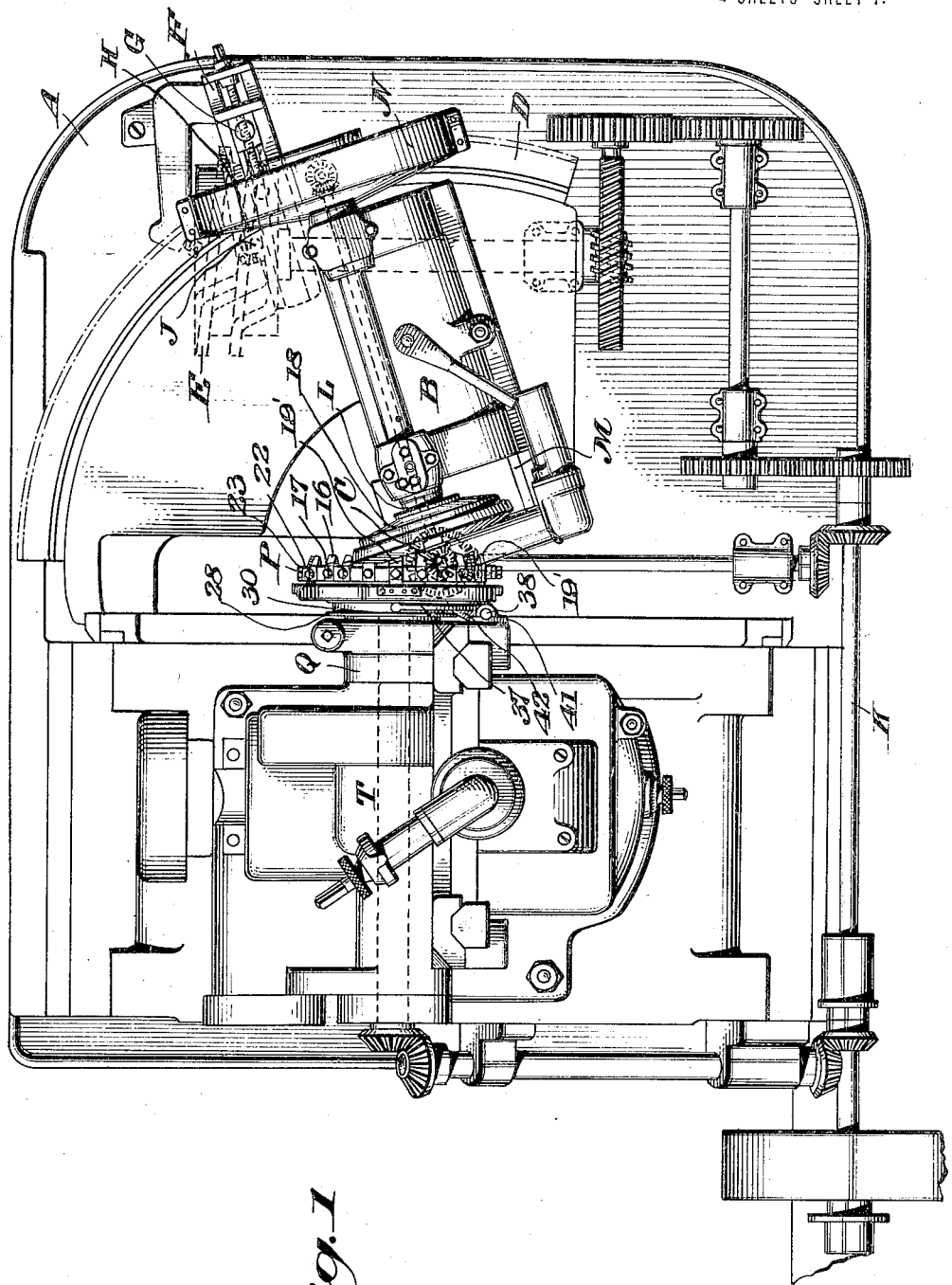
Figure 1 is a top plan view of a gear cutting machine having the present invention embodied therein.

The invention is illustrated as embodied in a bevel gear cutting machine. However, it is to be distinctly understood that the invention is not limited to this type of machine but is equally useful in other machines. Neither is it limited to metal cutting machines. On the contrary, the invention may be embodied in any of the many different machines which are employed for cutting or working materials.

Referring to the drawings, and more particularly to Figs. 1 and 2, the reference letter A indicates the base of a bevel gear cutting machine. As the invention is not limited to this type of machine, only so much of the same is shown and described as is necessary to an understanding of the present embodiment of the invention. The said base carries a table or work support B and a tool support T, one or both of which may be mounted for swinging movements. As shown the support B is mounted for angular or swinging movement about an axis indicated by C. For this purpose the forward end of the table is pivoted in any suitable manner about the axis C, and the other end may be adjustably secured to a curved bar D slidably mounted on the base. The table is oscillated back and forth about the axis C by means which is shown as a cylindrical cam E connected to the bar D by a lever F. This lever is pivoted at G and has the block H connected to the bar and the pin J operating in the groove of the cam E. The cam is driven by suitable connections from the main driving shaft K. The gear blank is mounted on an arbor L carried by the support B, and the support is adjustable on the way M toward and from the axis C so that the apex of the gear cone may be brought to proper position relative to said axis. An indexing mechanism N may be provided to periodically rotate the blank between cuts to bring a fresh portion of the blank into position to be cut. This indexing mechanism may be driven from the main shaft K, the indexing being timed with the oscillations of the table B.

A rotatable cutter P is mounted on the cutter head Q and driven from the main shaft K in any suitable manner. In the operation of the parts described above, the cutter rotates continually, and the table B is oscillated by the cam E to carry the face of the gear blank toward and from the cutter. When the blank is withdrawn from the cutter, the indexing mechanism operates to rotate the blank through the desired angle to bring a fresh portion of the same into position to be cut. As a rotatable cutter is used, the gear formed will be of the spiral bevel gear type.

As shown in Figs. 1 and 2 the path of the right hand points of the cutting edges of the cutter is at the right of the axis C and arranged so that an element of the dedendum cone is parallel to an adjacent and corresponding element of the addendum cone. Thus the gear cut is of the type described in Patent #1,112,509, granted October 6, 1914. It is to be understood however that the invention may be employed to cut gears of the usual types, a machine to cut the Williams type of gear being chosen to illustrate the invention because it requires no generative roll, and consequently the novel features and combinations of the present invention may be described without becoming confused in a mass of detail, as would be the case if the invention were described in connection with a machine employing a generative roll. As is well known, a machine having a generative action would require the tool support T to be mounted for swinging movement, as described for example in Patent #1,203,608, granted November 7, 1916.

The cutting tool as shown comprises a circular body portion 10 having a radial flange 11 arranged to form a seat 12 for the ring 13, the ring being secured in position by a plurality of cap screws 14 which extend through the ring and are threaded into the said flange. The periphery of the ring 13 is formed with a series of uniformly spaced notches 15 for the cutting members 16, which fit the notches and are secured in position by suitable means such as cap screws 17. As shown the members 16 project axially from the face of the ring 13 and are formed with cutting edges of proper shape to cut the desired space in the gear blank 18. In the embodiment of the invention illustrated, four of the notches 15 are provided with movable cutting members 19 and 19', although it is to be understood that the invention is not limited to this number but that more or less of these members may be employed as desired. Preferably the cutting members 16 are adapted to rough out or make the roughing cut on the blank and the members 19 to make the finishing cut. Hence it is desirable to mount and actuate the finishing cutters so that they may be brought into action or cutting position either after the roughing cut has been completed or toward the end of said roughing cut. For this purpose the finishing cutters are mounted for pivotal movement about an axis substantially tangential to the circular path of the cutters. Thus the member 19 may be provided with the opposite partial cylindrical bearing surfaces 20, the radially inner of which is seated in a corresponding recess in the block 21 fitted in the notch 15 and the radially outer of which engages in a corresponding recess in the plate 22, all of these parts being held together by a cap screw 23 which extends through the same and is threaded into the ring 13. In order to permit pivotal movement of the member 19 the aperture 24 for the cap screw 23 is flared, as shown. The member 19 is provided with a rearwardly extending bifurcated arm 25 which carries a roller 26 for a purpose presently to be described.

In cutting a space in the gear blank some of the cutting members operate to form the side of one tooth and other cutting members to form the side of an adjacent tooth although cutting members having cutting edges as disclosed in Patent #1,112,509 might be employed to form both sides of the same tooth. Hence in making a finishing cut with the finishing cutters 19 and 19' it is necessary to move some of them so that they will operate on the face of one tooth and others to operate on the face of an adjacent tooth. With the form of cutter described herein, mechanism is provided for moving the cutting edge of member 19 radially outward and the cutting edge of member 19' radially inward so that the former will operate on the side of one tooth and the latter on the side of the next or adjacent tooth. The cutting members 19' are mounted on the ring 13 in the same manner as described in connection with the member 19 and are formed the same, except that the rearwardly extending bifurcated arm is arranged so that the roller 26' carried by the same is held somewhat nearer the axis of the cutter than the roller 26 carried by the member 19. A plate or disk 27 has a hub 28 mounted on the bushing 29 for rotation with the tool body 10, this hub being formed with an annular groove 30. Although the plate 27 is mounted to rotate with the cutter, it is arranged for a slight sliding movement in the direction of the axis of the cutter, a spring 37' retaining it yieldingly in retracted position.

The side of the plate 27 facing the ring 13 is formed with the two axially extending flanges 31 and 32, these flanges being formed with the oppositely inclined surfaces 33 and 34. The rollers 26 are forced into contact with the surfaces 33 by means of strong springs 35 which are interposed between a plate 36 secured to the flange 32 and the bifurcations of the arms 25. The rollers 26' are forced into engagement with the inclined surfaces 34 by means of springs 35' interposed between the plate 36' and the bifurcations 25' of the member 19', the arrangement being substantially the same as that of the members 19 except that the springs act to force the inner ends of members 19' toward the axis of the cutter, whereas the springs act to force the corresponding ends of the members 19 radially outward or away from the said axis. From the foregoing description it will be seen that when the plate 27 or cam member is moved toward the right as viewed in Fig. 3, the inclined surfaces 33 will operate on the members 19 so as to throw their cutting edges radially outward, while the inclined surfaces 34 will act on the members 19' so as to throw their cutting edges radially inward, all of the movable edges thus being moved to cutting positions. When the cam member 27 is retracted or moved toward the left, as viewed in Fig. 3, the springs 35 and 35' will operate to retract or withdraw the finishing cutting edges from their cutting positions.

For the purpose of automatically actuating the cam member 27, a fork 37 is secured on a rock shaft 38 as by means of the set screw 39, the rock shaft being mounted in suitable bearings 40 and 41 on the tool support T. An arm 42 is secured to the lower end of the rock shaft 38 and a link 43 operatively connects this arm with the swinging table B. Thus as the table is swung in a counter-clockwise direction, as viewed in Figs. 1 and 2, to feed the blank into the cutter, the arm 42 will be swung to the right, as viewed in Fig. 2, thereby moving the cam plate 27 to the right as viewed in Fig. 3, causing the movable cutters to be projected into cutting position. When the table B is swung in the reverse direction to withdraw the blank from the cutter then the cam plate 27 will be moved to the left as viewed in Fig. 3 whereby the movable cutters will be retracted. In order to provide for the proper extent and timing of the movement of the movable cutters, as the swinging motion of table B may be varied for different sized blanks, the arm 42 and link 43 are adjustably connected together. Referring to Figs. 4 and 6, it will be seen that the arm 42 is formed with a slot 44 and a threaded rod 45 extends lengthwise of this slot having one end rotatably mounted as at 46 and the other end extending through a bearing 47 and is formed with the squared head 48. Longitudinal movement of this rod 45 is prevented by means of the removable bars 49 engaging in the groove 50. The end of the link 43 is forked to straddle the arm 42 and a pivot pin 51 threaded on the rod 45 connects this forked end to said arm. It will be seen that rotation of the rod 45 will move the pivot pin 51 radially with respect to the axis of the rock shaft 38 thereby determining the extent of the angular motion that will be transmitted to the said arm.

It is desirable that the finishing cutters shall come into operation at or near the completion of the roughing cut. Hence as the swinging motion of the table B is continuous some means must be provided so that motion will be transmitted to the finishing cutters only at the desired time. As shown for this purpose the link 43 is made so that it gives a lost motion connection between the table B and the arm 42. Referring to Fig. 6 it will be seen that the link 43 is made up of a rod 52 telescoped within a tubular member 53. The end of the rod 52 carries a pin 54, which projects radially through the longitudinal slots 55 in the tube and the ends of this pin carry a ring 56 slidable on the said tube. Another ring 57 is adapted to be adjustably secured on the tube as by means of set screws 58. Hence when the rod 52 is moved downward as viewed in Fig. 6 the ring 56 will abut against the ring 57 after a slight movement of the rod and any further movement will then be transmitted to the arm 42. Thus by adjusting the ring 57 on the tube portion 53 the amount of lost motion between the table B and the cam plate 27 may be controlled.

Instead of the inclined surfaces 33 and 34, and the rollers 26 and 26', other means might be employed for actuating the movable cutter members. Thus as shown in Fig. 7 the rearwardly extending bifurcated portion of the movable cutter 119 may be provided with a pin 120, which is located in a cam slot 121 carried by a plate 122 secured to the disk 127 similar to the disk 27 shown in Fig. 3. As the pin 120 fits the slot 121 the cutter member 119 is positively actuated in both directions.

From the foregoing description it is apparent that the present invention permits a finishing cut to be made immediately after a roughing cut, without in any way changing the setting of the tool or work. Heretofore it has generally been necessary either to finish the work in a separate machine or to change the tool, the feed, and perhaps reset the work. The saving in time, labor and defects due to improper resetting for the finishing cut is obvious.

It is to be understood that the invention is not limited to the specific tool or machine described, but includes modifications and changes which come within the scope of the appended claims.

Having thus described the invention what is claimed as new and desired to be secured by Letters Patent is:

1. In a machine of the class described, in combination, a tool having a part formed with a roughing cutting edge and a part formed with a finishing cutting edge, one of said parts being mounted for movement to and from cutting position and means for effecting said movement.

2. In a machine of the class described, in combination, a tool having a part formed with a roughing cutting edge and a part formed with a finishing cutting edge, one of said parts being mounted for movement to and from cutting position and automatic means for effecting said movement.

3. In a machine of the class described, in combination, work feeding means, a tool having a part formed with a roughing cutting edge and a part formed with a finishing cutting edge, one of said parts being mounted for movement to and from cutting position and means controlled by the work feeding means for effecting said movement.

4. In a machine of the class described, in combination, work feeding means, a tool having a part formed with a roughing cutting edge and a part formed with a finishing cutting edge, one of said parts being pivotally mounted for movement to and from cutting position and means controlled by the work feeding means for effecting said movement.

5. In a machine of the class described, in combination, a tool having a part formed with a roughing cutting edge and a part formed with a finishing cutting edge, one of said parts being pivotally mounted for movement to and from cutting position, and the other part being rigidly mounted, and means for effecting the movement of said movable part.

6. In a machine of the class described, in combination a tool having a rigidly mounted part formed with a roughing cutting edge and a pivoted part formed with a finishing cutting edge, and means for rocking said latter part on its pivot to swing it to and from cutting position.

7. In an automatic machine of the class described, in combination, a tool having a part formed with a roughing cutting edge and a part formed with a finishing cutting edge, one of said parts being mounted for movement to and from cutting position and means for effecting said movement actuated once for each cycle of movements of the machine in making a cut.

8. In an automatic machine of the class described, in combination, a tool having a rigidly mounted part formed with a roughing cutting edge and a pivoted part formed with a finishing cutting edge, and means for effecting a rocking of said latter part on its pivot to swing it to and from cutting position actuated once for each cycle of movements of the machine in making a cut.

9. A cutting tool for machines of the character described, including a body portion, a part rigidly secured thereto and a part movably mounted thereon, one of said parts having a roughing cutting edge and the other a finishing cutting edge.

10. A cutting tool for machines of the class described including a body portion, a part rigidly secured thereto and a part pivotally mounted thereon, one of said parts having a roughing cutting edge and the other a finishing cutting edge.

11. A cutting tool for machines of the class described including a body portion, a part rigidly and detachably secured thereto and a part detachably pivoted thereon, one of said parts having a roughing cutting edge and the other a finishing cutting edge.

12. A cutting tool for machines of the class described including a circular body portion having a member rigidly secured to its periphery and a member movably mounted thereon, one of said members having a roughing cutting edge and the other a finishing cutting edge.

13. A cutting tool for machines of the class described including a body portion, a pair of members rigidly secured to said portion and a pair of members movably mounted on said portion, one member of each pair having a cutting edge at one side and the other member of each pair having a cutting edge at the opposite side.

14. In a machine of the class described, in combination, a tool having a roughing cutting edge normally in cutting position and a finishing cutting edge normally in non-cutting position, and means for bringing the latter cutting edge into cutting position.

15. In a machine of the class described, in combination, a tool having means to make a roughing cut and means to make a finishing cut; one of said means being mounted for movement to and from cutting position, and means to actuate said last mentioned means.

16. In a machine of the class described, in combination, means to feed the work, a tool having means to make a roughing cut and means to make a finishing cut, one of said means being mounted for movement to and from cutting position, and means operated by said feeding means for actuating the movably mounted cutting means.

17. In a machine of the class described, in combination, means to feed the work, a tool having means to make a roughing cut and means to make a finishing cut, one of said means being mounted for movement to and from cutting position, and cam means operated by said feeding means for actuating the movably mounted cutting means.

18. In a machine of the class described, in combination, a rotatable tool having means to make a roughing cut and means to make a finishing cut, one of said means being mounted for movement to and from cutting position, and means to actuate said last mentioned means.

19. In a machine of the class described, in combination, a tool having means to make a roughing cut and means to make a finishing cut, one of said means being pivoted for movement to and from cutting position, and means to actuate said last mentioned means.

20. In a machine of the class described, in combination, a rotatable tool having axially extending roughing cut means and finishing cut means, one of said means being mounted for movement to and from cutting position, and means to actuate said last mentioned means.

21. In a machine of the class described, in combination, a tool having means to make a plurality of different kinds of cuts, and means for controlling the period of each cut.

22. In a machine of the character described, in combination, a tool having a plurality of parts each having a cutting edge, one of said parts being rigid with the tool and another of said parts being mounted for movement to and from cutting position and means for effecting said movement.

23. In a machine of the character described having work feeding means, in combination, a tool having a plurality of parts each having a cutting edge, one of said parts being mounted for movement to and from cutting position and means for effecting said movement controlled by the work feeding means.

24. In a machine of the character described, in combination, a tool having a rigid movably mounted member projecting on two opposite sides thereof, one of the projecting portions having a cutting edge, a controlling member operably connected to the other projecting portion to adjust the position of the cutting edge and means for actuating said controlling member.

25. In a machine of the character described, in combination, a rotatable tool including a circular body, a member movably mounted on said body projecting axially on two opposite sides thereof, one of the projecting portions having a cutting edge, a controlling cam arranged in rear of the cutter operably connected to the other portion to adjust the position of the cutting edge, and means for actuating said controlling member.

26. In a machine of the character described having feeding means, in combination, a rotatable tool including a circular body, a member movably mounted on said body projecting axially on two opposite sides thereof, one of the projecting portions having a cutting edge, a controlling cam arranged in rear of the cutter operably connected to the other portion to adjust the position of the cutting edge, and means for actuating said controlling member from said feeding means.

27. In a gear cutting machine having feeding means, in combination, a rotary cutter having a movably cutting edge, and means for adjusting the said edge controlled by the said feeding means.

28. In a bevel gear cutting machine of the type having a rotary cutter and blank holding means fed to make the cut by angular movement about an axis parallel to a line passing through the gear cone apex and perpendicular to the gear axis, the combination of a tool having a movably mounted cutting edge, and means for adjusting the position of said edge actuated in accordance with the movement of said blank holding means.

29. The combination with a gear cutting machine having a blank holder and a tool holder, one of said holders being mounted for swinging movement; of a tool having a roughing cut edge and a movable finishing cut edge, and means for automatically moving said finishing cut edge into and out of cutting position.

30. The combination with a gear cutting machine having a blank holder and a tool holder, one of said holders being mounted for swinging movement; of a tool having a roughing cut edge and a movable finishing cut edge, and means operated by said swinging holder for automatically moving said finishing cut edge into cutting position.

31. The combination with a gear cutting machine having a blank holder and a tool holder, one of said holders being mounted for swinging movement; of a tool having a roughing cut edge and a movable finishing cut edge, and means operated by said swinging holder for automatically moving said finishing cut edge into cutting position including a lost motion connection.

32. In combination with a gear cutting machine, of means for effecting a roughing cut, a second means for finishing said cut and means for rendering said finishing means operative, substantially at the completion of said roughing cut.

33. The combination with a gear cutting machine, of a pair of cutting members and automatic means for successively bringing said members into operation to rough out and thereafter finish the side of a tooth.

34. In a gear cutting machine, in combination, a blank support, a tool support, one of said supports mounted for swinging movement, means for roughing out a tooth space in the blank and a second means operated in timed relation with the movement of said swinging support to finish said space.

35. In a gear cutting machine, in combination, a blank support, a tool support, one of said supports mounted for swinging movement, means for roughing out the side of a tooth in the blank, and a second means operated in timed relation with the movement of said swinging support to finish said side.

36. In a machine of the class described, in combination, a tool having means to make a roughing cut and means to make a finishing cut, one of said means being mounted for movement toward and from cutting position, and means to actuate said last mentioned means.

In testimony whereof I affix my signature.

MILTON TIBBETTS.